United States Patent

Mori et al.

[11] Patent Number: 5,861,212
[45] Date of Patent: Jan. 19, 1999

[54] ADHESIVE COMPOSITION AND COMPOSITE OF RUBBER WITH FIBER

[75] Inventors: Osamu Mori, Kamakura; Mitsugu Ishihara, Kawasaki, both of Japan

[73] Assignee: Nippon Zeon Co., Ltd., Tokyo, Japan

[21] Appl. No.: 657,554

[22] Filed: Jun. 4, 1996

[30] Foreign Application Priority Data

Jun. 7, 1995 [JP] Japan .................................. 7-164665

[51] Int. Cl.⁶ ...................................................... B32B 25/02
[52] U.S. Cl. .................. 428/375; 428/390; 428/392; 428/393; 428/395; 428/413; 428/500; 428/521; 428/522; 442/149; 442/155; 474/205; 523/406; 523/407; 523/412; 524/534; 524/525; 524/526
[58] Field of Search ...................... 474/249, 264, 474/205; 428/500, 413, 521, 522, 390, 393, 375, 392, 395; 524/534, 525, 526; 523/406, 407, 412; 442/149, 155

[56] References Cited

U.S. PATENT DOCUMENTS

| | | | |
|---|---|---|---|
| 4,883,712 | 11/1989 | Ogawa et al. ......................... | 428/367 |
| 5,032,454 | 7/1991 | Oyama et al. ......................... | 428/392 |
| 5,077,127 | 12/1991 | Mori et al. ............................ | 428/390 |
| 5,159,010 | 10/1992 | Mori et al. ............................ | 524/510 |
| 5,219,902 | 6/1993 | Mishima et al. ...................... | 523/206 |
| 5,306,369 | 4/1994 | Fujiwara et al. ...................... | 156/110.1 |
| 5,626,953 | 5/1997 | Fujimoto et al. ..................... | 428/296.4 |

FOREIGN PATENT DOCUMENTS

| | | |
|---|---|---|
| 3-167239 | 7/1991 | Japan . |
| 63-248879 | 10/1996 | Japan . |

*Primary Examiner*—Paul Thibodeau
*Assistant Examiner*—D. Lawrence Tarazano
*Attorney, Agent, or Firm*—Armstrong, Westerman, Hattori, McLeland & Naughton

[57] ABSTRACT

An adhesive composition comprised of (A) a latex of 100 wt. parts of a carboxyl group-containing highly saturated nitrile-conjugated diene copolymer rubber, (B) 5–30 wt. parts of a resorcinol-formaldehyde resin, and (C) 2–10 wt. parts of an aromatic epoxy resin. A composite comprised of a nitrile group-containing highly saturated copolymer rubber and a fibrous material, which has been treated with the adhesive composition. This composite is useful for belts.

20 Claims, No Drawings

ADHESIVE COMPOSITION AND COMPOSITE OF RUBBER WITH FIBER

BACKGROUND OF THE INVENTION (1) Field of the Invention

This invention relates to an adhesive composition, and a composite such as, for example, a belt which is comprised of a fibrous material, treated with the adhesive composition, and a nitrile group-containing highly saturated copolymer rubber.

(2) Description of the Related Art

Belts such as an automobile timing belt, a poly-ribbed belt, a lapped belt and a V-belt are made of a composite comprised of a base fibrous material usually in a fabric form and a rubber. As the rubber, chloroprene rubber (CR) and an acrylonitrile-butadiene copolymer rubber (NBR), which have a good oil resistance, heretofore have been widely used. But, recently, there is an increasing demand for a nitrile group-containing highly saturated copolymer rubber which has good heat resistance as well as good oil resistance and thus meets requirements such as regulations for automobile exhaust gas, minimization of an engine room for weight-saving of an automobile, and encasement of an engine room for noise reduction.

Taking a timing belt as an example of the belts, the geared portion thereof is reinforced with a nylon canvas. The nylon canvas is treated with a rubber cement in an organic solvent for minimizing the abrasion of the belt caused by toothing with gears, and for enhancing the adhesion between the canvas and the rubber. However, in recent years, the treatment of an organic solvent has caused a problem of environmental pollution, and thus, a treatment with an aqueous rubber cement is now desired.

As adhesives for a nitrile group-containing highly saturated copolymer rubber with a fibrous material, there have heretofore been proposed an adhesive composition comprising a latex of a nitrile group-containing highly saturated copolymer rubber having an iodine value of not larger than 120 and a resorcinol-formaldehyde resin (Japanese Unexamined Patent Publication No. 63-248879); and an adhesive composition comprising a nitrile group-containing highly saturated copolymer rubber latex and a resorcinol-formaldehyde resin, which rubber latex is made by selectively hydrogenating the carbon-to-carbon double bonds of a nitrile group-containing unsaturated copolymer rubber in a latex, obtained by an emulsion polymerization procedure, in the presence of a hydrogenation catalyst (Japanese Unexamined Patent Publication No. 3-167239). The proposed adhesive compositions are aqueous and thus the problem of environmental pollution does not arise. Further, the fibrous material having been treated with these adhesive compositions exhibits an enhanced adhesion to the nitrile group-containing highly saturated copolymer rubber.

However, the fibrous material, which has been treated with the above-mentioned adhesive composition comprising the nitrile group-containing highly saturated copolymer rubber latex and a resorcinol-formaldehyde resin, has a poor abrasion resistance as compared with the fibrous material treated with an organic solvent-containing rubber cement. Especially where the above-mentioned adhesive composition comprising the nitrile group-containing highly saturated copolymer rubber latex and a resorcinol-formaldehyde resin is used for treating a canvas for a belt, the resulting belt has a poor abrasion resistance.

SUMMARY OF THE INVENTION

In view of the foregoing, an object of the present invention is to provide an aqueous adhesive composition used for treating a fibrous material for reinforcing rubber, which is capable of imparting good abrasion resistance as well as good adhesion to the fibrous material.

Another object of the present invention is to provide an aqueous adhesive composition which is capable of markedly enhancing abrasion resistance of a composite comprised of a nitrile group-containing highly saturated copolymer rubber and a fibrous material, especially a belt comprised of this rubber and a base fabric such as canvas.

A further object of the present invention is to provide a composite such as a belt comprised of nitrile group-containing highly saturated copolymer rubber and a fibrous material, which exhibits enhanced abrasion resistance with a good adhesion between the rubber and the fibrous material.

In one aspect of the present invention, there is provided an adhesive composition comprising:

(A) a latex of a carboxyl group-containing highly saturated nitrile-conjugated diene copolymer rubber, (B) 5 to 30 parts by weight, based on 100 parts by weight of the carboxyl group-containing highly saturated nitrile-conjugated diene copolymer rubber, of a resorcinol-formaldehyde resin, and (C) 2 to 10 parts by weight, based on 100 parts by weight of the carboxyl group-containing highly saturated nitrile-conjugated diene copolymer rubber, of an aromatic epoxy resin.

In another aspect of the present invention, there is provided a composite comprised of a nitrile group-containing highly saturated copolymer rubber and a fibrous material which has been treated with the above-mentioned adhesive composition comprising (A) a latex of a carboxyl group-containing highly saturated nitrile-conjugated diene copolymer rubber, (B) a resorcinol-formaldehyde resin, and (C) an aromatic epoxy resin.

DETAILED DESCRIPTION OF THE PREFERRED EMBODIMENTS (A) Carboxyl Group-Containing Highly Saturated Nitrile/Conjugated Diene Copolymer Rubber Latex The carboxyl group-containing highly saturated nitrile-conjugated diene copolymer rubber latex used in the present invention is prepared by hydrogenating a carboxyl group-containing unsaturated nitrile-conjugated diene copolymer rubber in absolution form and then converting the rubber solution to a latex by a phase inversion method (Japanese Unexamined Patent Publication No. 63-248879), or by hydrogenating a carboxyl group-containing unsaturated nitrile-conjugated diene copolymer rubber in a latex form, which is usually made by an emulsion polymerization procedure (Japanese Unexamined Patent Publication No. 2-178305 and ibid. No. 3-167239). The hydrogenation is effected by using a hydrogenation catalyst such as a palladium compound.

The carboxyl group-containing highly saturated nitrile-conjugated diene copolymer rubber has an iodine value of not larger than 120, preferably not larger than 80. If the iodine value exceeds 120, the fibrous material treated with the adhesive composition exhibits a poor heat resistance.

The carboxyl group-containing unsaturated nitrile-conjugated diene copolymer rubber is comprised of conjugated diene monomer units, $\alpha,\beta$-unsaturated nitrile monomer units, ethylenically unsaturated carboxylic acid monomer units and optional 14 other copolymerizable ethylenically unsaturated monomer units. Preferably, this copolymer rubber is comprised of 30 to 80% by weight of conjugated diene monomer units, 10 to 50% by weight of α,β-unsaturated nitrile monomer units, 1 to 10% by weight of ethylenically unsaturated carboxylic acid monomer units and 0 to 10% by weight of other copolymerizable ethylenically unsaturated monomer units, based on the total weight of the copolymer rubber.

The conjugated diene monomer used for the preparation of the carboxyl group-containing highly saturated nitrile-conjugated diene copolymer rubber is not particularly limited. As specific examples of the conjugated diene monomer, there can be mentioned aliphatic conjugated diene monomers such as 1,3-butadiene, isoprene, 2,3-dimethylbutadiene, 1,3-pentadiene and halogen-substituted butadiene. These conjugated diene monomers can be used either alone or in combination.

The α,β-unsaturated nitrile monomer also is not particularly limited provided that it has a nitrile group and a polymerizable double bond. As specific examples thereof, there can be mentioned acrylonitrile and methacrylonitrile.

As examples of the ethylenically unsaturated carboxylic acid monomer used for introducing a carboxyl group into the nitrile-conjugated diene copolymer, there can be mentioned, acrylic acid, methacrylic acid, itaconic acid and maleic acid.

To enhance the adhesion and abrasion resistance to a considerable extent, the ethylenically unsaturated carboxylic acid monomer is used preferably in an amount such that the highly saturated nitrile-conjugated diene copolymer rubber contains at least 0.02 equivalent weight per 100 parts by weight (ephr) of the copolymer, more preferably in the range of 0.02 to 0.10 ephr, of a carboxylic group.

As specific examples of the optional copolymerizable ethylenically unsaturated monomer, there can be mentioned esters of the above-recited unsaturated carboxylic acids such as methyl acrylate, methyl methacrylate, ethyl acrylate, ethyl methacrylate, butyl acrylate, butyl methacrylate, 2-ethylhexyl acrylate, 2-ethylhexyl methacrylate, trifluoroethyl acrylate, trifluoroethyl methacrylate, tetrafluoropropyl acrylate, tetrafluoropropyl methacrylate, ethyl itaconate, butyl fumarate, butyl maleate, methoxymethyl acrylate, methoxymethyl methacrylate, ethoxyethyl acrylate, ethoxyethyl methacrylate, methoxyethoxyethyl acrylate and methoxyethoxyethyl methacrylate; cyanoalkyl esters of acrylic acid and methacrylic acid such as cyanomethyl acrylate, cyanomethyl methacrylate, 2-cyanoethyl acrylate, 2-cyanoethyl methacrylate, 1-cyanopropyl acrylate, 1-cyanopropyl methacrylate, 2-ethyl-6-cyanohexyl acrylate, 2-ethyl-6-cyanohexyl methacrylate, 3-cyanopropyl acrylate and 3-cyanopropyl methacrylate; fluoroalkyl vinyl ethers such as fluoroethyl vinyl ether; and vinylpyridine. The copolymerizable monomer further includes, for example, N-(anilinophenyl) acrylamide, N-(anilinophenyl) methacrylamide, N-(anilinophenyl) cinnamamide, N-(anilinophenyl) crotonamide, N-(anilinophenyl)amino-2-hydroxypropyl allyl ether, N-(anilinophenyl)amino-2-hydroxypropyl methallyl ether, 5-N-(4-anilinophenyl) amino-2-hydroxypentyl acrylate and 5-N-(4-anilinophenyl) amino-2-hydroxypentyl methacrylate.

As specific examples of the carboxyl group-containing highly saturated nitrile-conjugated diene copolymer rubber, there can be mentioned a butadiene-acrylonitrile-methacrylic acid copolymer rubber, an isoprene-butadiene-acrylonitrile-methacrylic acid copolymer rubber, a butadiene-acrylonitrile-acrylic acid copolymer rubber and an isoprene-butadiene-acrylonitrile-acrylic acid copolymer rubber.

To enhance the water resistance and abrasion resistance of the carboxylic group-containing highly saturated nitrile-conjugated diene copolymer rubber used in the present invention, ethylenically unsaturated self-crosslinking monomer units may be introduced therein. As specific examples of the ethylenically unsaturated self-crosslinking monomer used there can be mentioned N-methylolacrylamide, N-methylolmethacrylamide, N,N'-dimethylolacrylamide, N,N'-dimethylolmethacrylamide, acrylamide, methacrylamide, N-methoxymethylacrylamide, N-methoxymethylmethacrylamide, N-ethoxymethylacrylamide, N-ethoxymethylmethacrylamide, N-butoxymethylacrylamide, N-butoxymethylmethacrylamide and N,N'-methylenebisacrylamide. Especially when a nylon base fabric is used, N-methylol group-containing monomers such as N-methylolacrylamide and N-methylolmethacrylamide are preferable for the intended enhancement of abrasion resistance.

The amount of the self-crosslinking monomer is up to 10% by weight, preferably 0.3 to 10% by weight, and more preferably 0.5 to 5% by weight, based on the weight of the copolymer rubber. High water resistance and abrasion resistance can be obtained even when its amount exceeds 10% by weight. But, when the amount of the self-crosslinking monomer is too large, the adhesion between a canvas and the rubber is reduced and the flexibility of the treated canvas is lowered.

Usually the copolymerization of the above-mentioned monomers is carried out by an emulsion polymerization. The emulsion polymerization procedure is not particularly limited, and may be conventional. Any of a batchwise, semi-batchwise or continuous method can be employed. The polymerization temperature and pressure also are not particularly limited.

The emulsifier used for the emulsion polymerization is not particularly limited. Anionic, cationic, nonionic and ampholytic surface active agents can be employed of these, an anionic surface active agent is preferable. The amount of the emulsifier also is not particularly limited, but is usually in the range of 1 to 10 parts by weight, preferably 2 to 6 parts by weight based on 100 parts by weight of the sum of the monomers, in view of the adhesion of the adhesive composition.

Conventional polymerization initiators and molecular weight modifiers can be employed.

Provided that the effect intended by the invention is achieved, one or more of other rubber latexes may be used in combination with the carboxylic group-containing highly saturated nitrile-conjugated diene copolymer rubber used in the present invention. Such rubber latexes include, for example, a styrene-butadiene copolymer rubber latex and its modified latex, an acrylonitrile-butadiene copolymer rubber latex and its modified latex, a chloroprene rubber latex, a chlorosulfonated polyethylene latex and natural rubber latex.

Adhesive Composition

The adhesive composition of the present comprises (A) a latex of a carboxyl group-containing highly saturated nitrile-conjugated diene copolymer rubber, (B) a resorcinol-formaldehyde resin, and (C) an aromatic epoxy resin.

The resorcinol-formaldehyde resin is not particularly limited, and those which are well known (which are described, for example, in Japanese Unexamined Patent Publication No. 55-142635) can be used. The ratio of resorcinol and formaldehyde used for the preparation of the resorcinol-formaldehyde resin is usually 1:1 to 1:5 by mole, preferably 1:1 to 1:3 by mole.

The amount of the resorcinol-formaldehyde resin in the adhesive composition is usually in the range of 5 to 30 parts by weight, preferably 8 to 20 parts by weight, based on 100 parts by weight of the solid content in the carboxyl group-containing highly saturated nitrile-conjugated diene copolymer rubber latex. If the amount of the resorcinol-formaldehyde resin is too large, the adhesive applied to the fibrous material becomes very hard and has no flexibility, and thus, the abrasion resistance of the adhesive-treated fibrous material is drastically reduced.

The aromatic epoxy resin used in the present invention is a product obtained by condensation of a polyphenol with epichlorohydrin, which has at least two phenyl groups in the molecule. As specific examples of the aromatic epoxy resin, there can be mentioned a bisphenol A-type epoxy resin obtained by reacting bisphenol A with epichlorohydrin in the presence of an alkali, a bisphenol F-type epoxy resin obtained by reacting bisphenol F with epichlorohydrin in the presence of an alkali, a resin obtained by brominating the bisphenol A- or F-type epoxy resin, and a resin obtained by modifying the bisphenol A- or F-type epoxy resin with a urethane. Also, a novolak type epoxy resin obtained by glycidyl-etherification of a novolak resin, i.e., by reaction of a novolak resin with epichlorohydrin, may be used. The epoxy equivalent of the aromatic epoxy resin is not particularly limited, but is preferably smaller than 2,000 in view of the enhanced abrasion resistance of the base fabric treated with the adhesive composition.

The aromatic epoxy resin is preferably used in the form of an aqueous dispersion. The amount of the aromatic epoxy resin is in the range of 2 to 20 parts by weight, preferably 3 to 7 parts by weight, based on 100 parts by weight of the carboxyl group-containing highly saturated nitrile-conjugated diene copolymer rubber. If the amount of the aromatic epoxy resin is too small, the canvas treated with the adhesive composition has poor abrasion resistance. In contrast, if the amount of the aromatic epoxy resin is too large, the adhesion of the canvas to the adherend rubber is poor.

It is essential that the adhesive composition of the present invention comprises neither an aliphatic nor alicyclic epoxy resin, but an aromatic epoxy resin. If an aliphatic epoxy resin or an alicyclic epoxy resin is used instead of an aromatic epoxy resin, it is impossible to enhance both the abrasion resistance of the adhesive-treated canvas and the adhesion between the base fabric and the adherend rubber.

It also is important that the adhesive composition of the present invention comprises both an aromatic epoxy resin and a resorcinol-formaldehyde resin. Even if a fibrous material is pre-treated with an epoxy resin solution, dried and then, treated with an adhesive composition comprising a resorcinolformaldehyde resin it is impossible to enhance both the abrasion resistance of the adhesive-treated fibrous material and the adhesion between the fibrous material and the adherend rubber.

If desired, conventional adhesion-enhancing materials can be incorporated in the adhesion composition. Such adhesion-enhancing materials include, for example, 2,6-bis-(2,4-dihydroxyphenylmethyl)-4-chlorophenol or analogues thereof, an isocyanate, blocked isocyanate, ethylene urea, polyepoxide and a modified polyvinyl chloride.

In some cases, a sulfur-containing vulcanizer and a vulcanization promotor may be incorporated in the adhesive composition to improve abrasion resistance of the abrasive-treated canvas. An aqueous carbon black dispersion can be incorporated in the adhesive composition, provided that the effect intended by the invention can achieved.

It is not preferable to incorporate a compound of a metal of group II of the periodic table, such as an oxide or hydroxide of zinc, magnesium, calcium or barium, in the adhesive composition of the present invention. The incorporation of a compound of the group II metal in the adhesive composition of the present invention results in reduction in water resistance, leading to reduction in mechanical strengths.

Treatment of Fibrous Material with Adhesive Composition

The fibrous material which is treated by the adhesive composition of the present invention can be made of various fibers. The fibers used include, for example, cotton, vinylon, rayon, nylon, a polyester fiber and an aramid fiber. These fibers can be used in the form of, for example, a staple fiber, a filament, a cord and a fabric such as canvas. Of these, canvas is most preferable for the provision of a belt having a high abrasion resistance.

The procedure by which the fibrous material is treated with the adhesive composition is not particularly limited, and conventional procedures employed for treating the known resorcinol-formaldehyde resin/polymer latexes can be employed. For example, a canvas is dipped in a solution of the adhesive composition and, if desired, dried at a temperature of about 100 to 150° C. for 0.5 to 10 minutes, and then, heat-treated. The heat-treatment is carried out under temperature and time conditions such that the adhesive composition applied by the dipping reacts and is cured to a desired extent. Usually the treating temperature and time are about 130 to 250° C. and several minutes, respectively. According to the particular type of the canvas, the canvas can be dipped in an isocyanate solution, an epoxy resin solution or a mixed solution thereof, followed by drying, prior to the treatment with the adhesive composition. The drying in this pre-treatment is preferably carried out at a temperature not higher than the drying temperature employed after dipping in the adhesive composition.

The amount of the adhesive composition deposited on the fibrous material is usually 2 to 40% by weight, preferably 3 to 30% by weight, based on the weight of the fibrous material.

Composite of Rubber with Fibrous Material

As the nitrile group-containing highly saturated copolymer rubber which is combined with the adhesive-treated fibrous material, those which are known and described, for example, in Japanese Examined Patent Publication No. 2-43767, Japanese Unexamined Patent Publication No. 63-248879 and ibid. No. 3-167239 can be used. A nitrile group-containing highly saturated copolymer rubber similar to the above-mentioned carboxyl group-containing highly saturated nitrile-conjugated diene copolymer rubber can also be used.

As specific examples of the nitrile group-containing highly saturated copolymer rubber, there can be mentioned a hydrogenated product of a butadiene-acrylonitrile copolymer rubber, a hydrogenated product of an isoprene-butadiene-acrylonitrile copolymer rubber, a hydrogenated product of an isoprene-acrylonitrile copolymer rubber, a butadiene-methyl acrylate-acrylonitrile copolymer rubber and a hydrogenated product thereof, a butadiene-acrylic acid-acrylonitrile copolymer rubber and a hydrogenated product thereof, a butadiene-ethylene-acrylonitrile copolymer rubber, a butyl acrylate-ethoxyethyl acrylate-vinyl chloroacetate-acrylonitrile copolymer rubber, and butyl acrylate-ethoxy-ethyl acrylate-vinylnorbornene-acrylonitrile copolymer rubber.

The nitrile group-containing highly saturated copolymer rubber preferably contains 10 to 60% by weight, based on the weight of the copolymer rubber, of units derived from a nitrile group-containing monomer in view of the oil resistance of the rubber/fibrous material composite, and further the copolymer rubber has an iodine value of not larger than 120, more preferably not larger than 100 and most preferably not larger than 80.

The nitrile group-containing highly saturated copolymer rubber, as combined with the fibrous material to form a composite, is subjected to vulcanization. The vulcanizing agent used is not particularly limited and is usually selected from conventional sulfur or sulfur-containing vulcanizing agents and peroxide vulcanizing agents.

The rubber/fibrous material composite is prepared by a process wherein the fibrous material which has been treated with the adhesive composition is embedded in the nitrile group-containing highly saturated copolymer rubber composition having incorporated therein a vulcanizer, a filler and other additives, and then the nitrile group-containing highly saturated copolymer rubber is vulcanized. The vulcanization is usually carried out at a temperature of 130 to 200° C. and a pressure of 0.5 to 10 MPa for 1 to 120 minutes.

The fibrous material, which has been treated with the adhesive composition of the present invention comprising (A) a carboxyl group-containing highly saturated nitrile-conjugated diene copolymer rubber latex, (B) a resorcinol-formaldehyde. resin, and (C) an aromatic epoxy resin has excellent abrasion resistance and water resistance and, even after heat aging, exhibits high flexibility and strength. Therefore, the composite of the present invention, which is composed of (i) a nitrile group-containing highly saturated copolymer rubber and (ii) the adhesive composition-treated fibrous material, is useful for a belt such as a timing belt to which a high heat resistance is required.

The composite of the present invention is further useful as a rubbery material for a toothed belt because the toothed belt exhibits a high stress. In general a toothed belt is composed of a main body having a plurality of teeth provided at regular intervals along the length of the belt and the back portion having embedded therein cords extending along the length of the belt. The toothed portion of the main body is covered with a canvas which is made of, for example, an aromatic polyamide fiber, an urethane elastomer fiber or a polyester fiber, and which is treated with a resorcinol-formaldehyde resin latex. The cords embedded in the back portion are made of a glass fiber, an aromatic polyamide fiber or a carbon fiber.

A toothed belt having the toothed portion and the back portion, both of which have a rubber layer made of the composite of the present invention, exhibits a high stress. The procedure by which the toothed belt is made is not particularly limited. Usually a covering canvas treated with the adhesive composition, cords treated with the adhesive composition, and the nitrile group-containing highly saturated copolymer rubber are placed in this order in a mold, and thereafter, the rubber is vulcanized.

The invention will now be described specifically by the following examples. In the examples, comparative examples and reference examples, parts and % are by weight unless otherwise specified.

Preparation of Carboxyl Group-Containing Highly Saturated Nitrile Rubber Latex (A)

A pressure bottle having an inner volume of 1 liter was charged with 240 parts of water, 2.5 parts of sodium alkylbenzenesulfonate, 35 parts of acrylonitrile, and 3 parts by weight of methacrylic acid in this order. The inside of the bottle was flashed with nitrogen, and then 60 parts of butadiene was injected into the bottle. Then 0.25 part of ammonium persulfate as a polymerization initiator was added, and a polymerization was conducted at a temperature of 40° C. to give a latex of a carboxyl group-containing acrylonitrile-butadiene copolymer rubber.

The solid content in the carboxyl group-containing acrylonitrile-butadiene copolymer rubber latex was adjusted to 12%. An autoclave having an inner volume of 1 liter and equipped with a stirrer was charged with the 400 ml of the carboxyl group-containing acrylonitrile-butadiene copolymer rubber latex (total solid content: 48 g). Gaseous nitrogen was blown through the rubber latex for 10 minutes to remove oxygen dissolved therein. Then 100 mg of palladium nitrate as a hydrogenation catalyst was dissolved in an aqueous nitric acid solution composed of 240 ml of water and nitric acid in an amount of 4 times by mole of the palladium. The thus-prepared palladium nitrate solution was added into the rubber latex. The inside of the autoclave was flashed twice with hydrogen, the pressure of hydrogen was increased to 30 atmospheric pressure, and then the content was heated to 50° C. to effect a reaction. After the reaction was conducted for 6 hours, the content was concentrated to a solid content of about 40% by using an evaporator to give a latex (hereinafter abbreviated to "A-1") of a carboxyl group-containing highly saturated acrylonitrile-butadiene copolymer rubber having an iodine value of 28.

A latex (abbreviated to "B-1") of self-crosslinking, carboxylgroup-containing highly saturated acrylonitrile-butadiene copolymer rubber was prepared by the same procedure as that mentioned above, except that a monomer mixture composed of 35 parts of acrylonitrile, 5 parts of methacrylic acid, 2 parts of N-methylol methacrylamide, and 58 parts of butadiene was used.

A latex (abbreviated to "C-1") of a highly saturated acrylonitrile-butadiene copolymer rubber not containing a carboxyl group was prepared by the same procedure as that mentioned above, except that a monomer mixture composed of of acrylonitrile and butadiene was used.

Iodine value, average particle diameter and pH of the obtained rubber latexes were measured. The results are shown in Table 1.

TABLE 1

| Latex No. | A-1 | B-1 | C-1 |
|---|---|---|---|
| Amount of AN (%) | 35 | 35 | 35 |
| Amount of COOH group (ephr) | 0.05 | 0.05 | 0 |
| Amount of N-methylol methacrylamide (%) | 0 | 1 | 0 |
| Iodine value | 28 | 31 | 26 |
| Average particle diameter (μm) | 0.12 | 0.11 | 0.10 |
| Solid content (%) | 40.5 | 40.5 | 40.1 |
| pH | 8.6 | 8.5 | 9.5 |

Preparation of Adhesive Composition

According to the recipe shown in Table 2, 6.5 parts of resorcinol, 9.4 parts of formalin (37% concentration) and 3.0 parts of aqueous sodium hydroxide (10% concentration) were dissolved in 139.6 parts of water. The mixture was maintained at a temperature of 25° C. for 6 hours under agitation whereby a reaction was conducted to give an aqueous resorcinol-formaldehyde resin solution. (RF solution). To the RF solution, 250 parts of each of nitrile rubber latexes A-1, B-1 and C-1 (40% concentration), 50 parts of an aqueous dispersion containing 10% of each of the epoxy resins shown in Table 3, and 93 parts of soft water were added, and the mixture was maintained at a temperature of 25° C. for 20 hours under agitation whereby a reaction was conducted to give a resorcinol-formaldehyde resin latex (RFL solution). Then 40 parts of an aqueous HAF carbon dispersion (25% concentration) was added to the RFL solution to give an adhesive composition.

TABLE 2

| RF solution (Resorcinol-formaldehyde resin solution) | |
|---|---|
| Resorcinol | 6.5 parts |
| Formaldehyde (37%) | 9.4 |
| Sodium hydroxide (10%) | 3.0 |
| Soft water | 139.6 |
| Total | 158.5 parts |
| RFL solution (Resorcinol-formaldehyde resin latex) | |
| Latex | 250.0 parts |
| RF solution | 158.5 |
| Aqueous epoxy resin dispersion (10%) | 50.0 |
| Soft water | 93.0 |
| Total | 551.5 parts |
| Adhesive composition | |
| RFL solution | 551.5 parts |
| Aqueous HAF carbon dispersion (25%) | 40.0 |
| Total | 591.5 parts |

TABLE 3

| Trade name | Epoxy equivalent | Chemical structure |
|---|---|---|
| E-1 | Aquatohto 5003 | 205 | Bisphenol A-type epoxy resin |
| E-2 | Aquatohto 3520 | 525 | Bisphenol A-type epoxy resin |
| E-3 | Aquatohto 35201 | 700 | Bisphenol A-type epoxy resin |
| E-4 | Aquatohto 3540 | 1,800 | Bisphenol A-type epoxy resin |
| E-5 | Aquatohto 5520 | 540 | Urethane-modified epoxy resin |
| E-6 | Dinacol EX313 | — | Glycerol diglycidylether |
| E-7 | Dinacol EX611 | — | Sorbitol diglycidylether |

Note
E-1 through E-5: supplied by Pecten Chemicals.
E-6 and E-7: supplied by Nagase Sangyo K.K.

Preparation of Aqueous Zinc Oxide Dispersion

According to the recipe shown in Table 4, an aqueous zinc oxide dispersion having a solid content of 50% was prepared by using a porcelain ball mill.

TABLE 4

| Ingredients | Amount |
|---|---|
| Zinc oxide #1 | 50 parts |
| Dimol N (45%) *1 | 15 |
| Ammonium casein (10%) | 50 |
| Water | 8 |
| Total | 123 parts |

TABLE 4-continued

| Ingredients | Amount |
|---|---|

*1 Sodium naphthalene-formaldehyde sulfonate supplied by Kao Corp.

Preparation of Adherend Rubber Formulation

According to the recipes (i), (ii) and (iii), shown in Table 5, a nitrile group-containing highly saturated copolymer rubber and formulation ingredients were kneaded together by a roll mill to prepare a rubber formulation sheet having a thickness of about 2.5 mm.

TABLE 5

| | (parts) | | |
|---|---|---|---|
| Formulation No. | i | ii | iii |
| Zetpol 2020 *1 | 100 | — | 60 |
| Zetpol 2000 *2 | — | 100 | — |
| ZSC 2295 *3 | — | — | 40 |
| Zinc oxide #1 | 5 | 5 | 5 |
| Stearic acid | 1 | 1 | 1 |
| SRF carbon black | 40 | 40 | 30 |
| Sulfur | 0.5 | — | — |
| Tetramethylthiuram disulfide | 1.5 | — | — |
| 2-Mercaptobenzothiazole | 0.5 | — | — |
| Peroximon F-40 *4 | — | 6 | 6 |

*1 Highly saturated acrylonitrile-butadiene copolymer rubber having an iodine value of 28 and a bound acrylonitrile content of 36%, supplied by Nippon Zeon Co.
*2 Highly saturated acrylonitrile-butadiene copolymer rubber having an iodine value of 4 and a bound acrylonitrile content of 36%, supplied by Nippon Zeon Co.
*3 Rubber formulation comprising Zetpol 2020, as the base polymer,
*4 α,α'-bis(t-butylperoxyisopropyl)benzene

EXAMPLES 1 TO 5

A canvas woven from nylon 66 was dipped with an adhesive composition prepared according to the recipe shown in Table 2 from latex A-1 and each of the epoxy resins E-1 to E-5 shown in Table 3. Then the dipped nylon 66 canvas was heat-treated at 180° C. for 2 minutes.

The thus-treated nylon 66 canvas was superposed upon rubber formulation (i) prepared according to the recipe shown in Table 5, and the combined nylon 66 canvas/rubber was subjected to press vulcanization at a pressure of 5 MPa and a temperature of 150° C. for 30 minutes whereby a square nylon 66 canvas/rubber composite having a size of 15 cm×15 cm was obtained.

Abrasion loss of the adhesive composition on the treated nylon 66 canvas of the composite was measured by using a Taber abrasion for carpet under a load of 1 kg, at an abrasion surface temperature of 120° C. (heated by an infrared lamp) and a disc revolution of 10,000. Abrasion resistance was evaluated based on the abrasion loss of the adhesive composition and expressed by the following five ratings. The results are shown in Table 6.

10: No abrasion loss or abrasion loss is not larger than 10%
9: Abrasion loss is at least 10% but not larger than 20%
8: Abrasion loss is at least 20% but not larger than 30%
7: Abrasion loss is at least 30% but not larger than 40%
6: Abrasion loss is at least 40% but not larger than 50%
5: Abrasion loss is at least 50% but not larger than 60%
4: Abrasion loss is at least 60% but not larger than 70%
3: Abrasion loss is at least 70% but not larger than 80%

2: Abrasion loss is at least 80% but not larger than 90%

1: Abrasion loss is at least 90%

The adhesive-treated nylon 66 canvas was superposed upon rubber formulation (i) prepared according to the recipe shown in Table 5, and the combined nylon 66 canvas/rubber was subjected to press vulcanization at a pressure of 5 MPa and a temperature of 150° C. for 30 minutes whereby a square nylon 66 canvas/rubber composite having a size of 2.5 cm×15 cm was obtained.

Peeling test was conducted on the nylon 66 canvas/-rubber composite by using an Instron tensile tester at a pulling speed of 50 mm/min. The results are shown in Table 6.

COMPARATIVE EXAMPLES 1 TO 4

Nylon 66 canvas/rubber composites were made, and abrasion resistance and peeling strength was evaluated by the same procedures as described in Example 1 except that epoxy resin E-6 or E-7 were used instead of epoxy resin E-1 in Comparative Examples 1 and 2, rubber latex C-1 was used instead of rubber latex A-1 in Comparative Example 3, and the aqueous zinc oxide dispersion prepared according to the recipe shown in Table 4 was used instead of epoxy resin E-1 in Comparative Example 4. The results are shown in Table 6.

TABLE 6

|  | Example |  |  |  |  | Comparative Example |  |  |  |
|---|---|---|---|---|---|---|---|---|---|
|  | 1 | 2 | 3 | 4 | 5 | 1 | 2 | 3 | 4 |
| Latex No. | A-1 | A-1 | A-1 | A-1 | A-1 | A-1 | A-1 | C-1 | A-1 |
| Epoxy resin. | E-1 | E-2 | E-3 | E-4 | E-5 | E-6 | E-7 | E-1 | ZnO |
| Abrasion resistance (rating) | 9 | 9 | 9 | 8 | 8 | 8 | 8 | 5 | 6 |
| Peeling strength (N/25 mm) | 300 | 280 | 285 | 290 | 290 | 140 | 120 | 295 | 285 |

As seen from Table 6, the nylon 66 canvas treated with the adhesive compositions of the present invention comprising (A) a carboxyl group-containing highly saturated nitrile-conjugated diene copolymer rubber latex, (B) a resorcinol-formaldehyde resin, and (C) an aromatic epoxy resin exhibit enhanced and balanced abrasion resistance and adhesion strength (Examples 1 to 5). When an aliphatic epoxy resin is used instead of the aromatic epoxy resin (C) (Comparative Examples 1 and 2), when an adhesive composition containing a latex of a highly saturated nitrile-conjugated diene copolymer rubber which does not contain a carboxyl group is used instead of the adhesive composition of the present invention (Comparative Example 3), or an aqueous dispersion of zinc oxide is used instead of the aromatic epoxy resin (C) (Comparative Example 4), at least one of the abrasion resistance and peeling strength of the adhesive-treated nylon 66 canvas is poor.

EXAMPLES 6 TO 10

Nylon 66 canvas/rubber composites were prepared and their abrasion resistance and peeling strength were evaluated by the same procedures as described in Examples 1 to 5 except that latex B-1, i.e.., a latex of a self-crosslinking, carboxyl group-containing highly saturated nitrile-conjugated diene copolymer rubber was used instead of the carboxyl group-containing highly saturated nitrile-conjugated diene copolymer rubber latex A-1. The results are shown in Table 7.

TABLE 7

|  | Example |  |  |  |  |
|---|---|---|---|---|---|
|  | 6 | 7 | 8 | 9 | 10 |
| Latex No. | B-1 | B-1 | B-1 | B-1 | B-1 |
| Epoxy resin | E-1 | E-2 | E-3 | E-4 | E-5 |
| Abrasion resistance (rating) | 8 | 9 | 9 | 9 | 8 |
| Peeling strength (N/25 mm) | 320 | 310 | 300 | 310 | 305 |

As seen from Table 7, when a latex of a self-crosslinking, carboxyl group-containing highly saturated nitrile-conjugated diene copolymer rubber is used as the carboxyl group-containing highly saturated nitrile-conjugated diene copolymer rubber latex in the adhesive composition of the present invention, the resulting nylon 66 canvas/rubber composite exhibit a more enhanced abrasion resistance.

EXAMPLES 11 TO 14

Nylon 66 canvas/rubber composites were made and the abrasion resistance and peeling strength thereof were evaluated by the same procedure as that described in Example 1 except that adhesive compositions prepared from rubber latex A-1 or B-1, a resorcinol-formaldehyde and aromatic epoxy resin E-1 in an amount shown in Table 8 were used; that rubber formulation (ii) prepared according to the recipe shown in Table 5 was used instead of rubber formulation (i); and that the combined nylon 66 canvas/-rubber was subjected to press vulcanization at a pressure of 5 MPa and a temperature of 160° C. for 30 minutes. The results are shown in Table 8.

COMPARATIVE EXAMPLES 5 AND 6

Nylon 66 canvas/rubber composites were made and the abrasion resistance and peeling strength thereof were evaluated by the same procedure as that described in Example 10 except that the amount of aromatic epoxy resin E-1 was reduced to 1.0 part (Comparative Example 5) or the aromatic epoxy resin E-1 was not used (Comparative Example 6). The results are shown in Table 8.

TABLE 8

|  | Example |  |  |  | Comp. Exam. |  |
|---|---|---|---|---|---|---|
|  | 11 | 12 | 13 | 14 | 5 | 6 |
| Latex No. | A-1 | A-1 | B-1 | B-1 | A-1 | A-1 |
| Epoxy resin and amount (parts) | E-1 3.0 | E-1 7.0 | E-1 2.0 | E-1 3.0 | E-1 1.0 | E-1 0 |

TABLE 8-continued

|  | Example | | | | Comp. Exam. | |
| --- | --- | --- | --- | --- | --- | --- |
|  | 11 | 12 | 13 | 14 | 5 | 6 |
| Abrasion resistance(rating) | 8 | 9 | 9 | 9 | 6 | 6 |
| Peeling strength (N/25 mm) | 300 | 240 | 315 | 310 | 310 | 280 |

As seen from Table 8, when the amount of aromatic epoxy resin E-1 is at least 2.0 parts by weight based on 100 parts by weight of rubber (Examples 11 to 14), the abrasion resistance is enhanced to the desired extent. When the amount of aromatic epoxy resin E-1 is smaller than 2.0 parts by weight (Comparative Example 5) or an aromatic epoxy resin is not used (Comparative Example 6), the abrasion resistance is poor.

EXAMPLES 15 TO 18

Nylon 66 canvas/rubber composites were made and the abrasion resistance and peeling strength thereof were evaluated by the same procedure as that described in Example 1 except that adhesive compositions prepared from rubber latex A-1 or B-1, a resorcinol-formaldehyde and aromatic epoxy resin E-1 or E-2 were used; and that rubber formulation (ii) or (iii) prepared according to the recipe shown in Table 5 was used instead of rubber formulation (i). The results are shown in Table 9.

TABLE 9

|  | Example | | | |
| --- | --- | --- | --- | --- |
|  | 15 | 16 | 17 | 18 |
| Latex No. | A-1 | A-1 | B-1 | B-1 |
| Epoxy resin | E-1 | E-2 | E-1 | E-2 |
| Rubber formulation | ii | ii | iii | iii |
| Abrasion resistance (rating) | 9 | 8 | 9 | 8 |
| Peeling strength (N/25 mm) | 310 | 300 | 295 | 315 |

What is claimed is:

1. An adhesive composition comprising:
   (A) a latex of a carboxyl group-containing highly saturated nitrile-conjugated diene copolymer rubber having an iodine value not larger than 120,
   (B) 5 to 30 parts by weight, based on 100 parts by weight of the carboxyl group-containing highly saturated nitrile-conjugated diene copolymer rubber, of a resorcinol-formaldehyde resin, and
   (C) 2 to 10 parts by weight, based on 100 parts by weight of the carboxyl group-containing highly saturated nitrile-conjugated diene copolymer rubber, of an aromatic epoxy resin which is a condensation product of a polyphenol with epichlorohydrin.

2. The adhesive composition according to claim 1, wherein said carboxyl group-containing highly saturated nitrile-conjugated diene copolymer rubber contains at least 0.02 equivalent weight, per 100 parts by weight of the copolymer rubber, of a carboxyl group.

3. The adhesive composition according to claim 1, wherein said carboxyl group-containing highly saturated nitrile-conjugated diene copolymer rubber has an iodine value not larger than 80, and contains 0.05 to 0.10 equivalent weight, per 100 parts by weight of the copolymer rubber, of a carboxyl group.

4. The adhesive composition according to claim 1, wherein said carboxyl group-containing highly saturated nitrile-conjugated diene copolymer rubber is a hydrogenated product of a carboxyl group-containing unsaturated nitrile-conjugated diene copolymer rubber comprising, based on the weight of the copolymer rubber, of 30 to 80% by weight of conjugated diene monomer units, 10 to 50% by weight of α,β-unsaturated nitrile monomer units, 1 to 10% by weight of ethylenically unsaturated carboxylic acid monomer units, and 0 to 10% by weight of at least one copolymerizable ethylenically unsaturated monomer units.

5. The adhesive composition according to claim 4, wherein the conjugated diene monomer is selected from the group consisting of 1,3-butadiene, isoprene, 2,3-dimethyl-butadiene, 1,3-pentadiene and halogen-substituted butadienes; the α,β-unsaturated nitrile monomer is selected from the group consisting of acrylonitrile and methacrylonitrile; and the ethylenically unsaturated carboxylic acid monomer is selected from the group consisting of acrylic acid, methacrylic acid, itaconic acid and maleic acid.

6. The adhesive composition according to claim 4, wherein said carboxyl group-containing unsaturated nitrile-conjugated diene copolymer rubber further comprises 0.3 to 10% by weight, based on the weight of the copolymer rubber, of an ethylenically unsaturated self-crosslinking monomer units.

7. The adhesive composition according to claim 6, wherein said ethylenically unsaturated self-crosslinking monomer is selected from the group consisting of acrylamide, methacrylamide, N-substituted or N,N'-disubstituted acrylamide, and N-substituted or N,N'-disubstituted methacrylamide.

8. The adhesive composition according to claim 1, wherein said carboxyl group-containing unsaturated nitrile-conjugated diene copolymer rubber is selected from the group consisting of a butadiene-acrylonitrile-methacrylic acid copolymer rubber, an isoprene-butadiene-acrylonitrile-methacrylic acid copolymer rubber, a butadiene-acrylonitrile-acrylic acid copolymer rubber, and an isoprene-butadiene-acrylonitrile-acrylic acid copolymer rubber.

9. The adhesive composition according to claim 1, wherein the amount of the resorcinol-formaldehyde resin is in the range of 8 to 20 parts by weight based on 100 parts by weight of the copolymer rubber.

10. The adhesive composition according to claim 1, wherein the ratio of resorcinol/formaldehyde used for the preparation of the resorcinol-formaldehyde resin is in the range of 1/1 to 1/5 by mole.

11. The adhesive composition according to claim 1, wherein said aromatic epoxy resin has an epoxy equivalent not larger than 2,000.

12. The adhesive composition according to claim 11, wherein the polyphenol is selected from the group consisting of bisphenol A, bisphenol B, and a novolak resin.

13. The adhesive composition according to claim 1, wherein the amount of the aromatic epoxy resin is in the range of 3 to 7 parts by weight based on 100 parts by weight of the carboxyl group-containing highly saturated nitrile-conjugated diene copolymer rubber.

14. A composite comprised of a nitrile group-containing highly saturated copolymer rubber and a fibrous material, which has been treated with an adhesive composition; said adhesive composition comprising:
   (A) a latex of a carboxyl group-containing highly saturated nitrile-conjugated diene copolymer rubber having an iodine value not larger than 120, (B) 5 to 30 parts by weight, based on 100 parts by weight of the carboxyl group-containing highly saturated nitrile-conjugated diene copolymer rubber, of a resorcinol-formaldehyde resin, and (C) 2 to 10 parts by weight, based on 100 parts by weight of the carboxyl group-containing highly saturated nitrile-conjugated diene copolymer rubber, of an aromatic epoxy resin which is a condensation product of a polyphenol with epichlorohydrin.

15. The composition according to claim 14, wherein the nitrile group-containing highly saturated copolymer rubber contains 10 to 60% by weight, based on the weight of the copolymer rubber, of nitrile group-containing monomer units.

16. The composite according to claim 14, wherein the nitrile group-containing highly saturated copolymer rubber is selected from the group consisting of a hydrogenated product of a butadiene-acrylonitrile copolymer rubber, a hydrogenated product of an isoprene-butadiene-acrylonitrile copolymer rubber, a hydrogenated product of an isoprene-acrylonitrile copolymer rubber, a butadiene-methyl acrylate-acrylonitrile copolymer and a hydrogenated product thereof, a butadiene-acrylic acid-acrylonitrile copolymer rubber and a hydrogenated product thereof, a butadiene-ethylene-acrylonitrile copolymer rubber, a butyl acrylate-ethoxyethyl acrylate-vinyl chloroacetate-acrylonitrile copolymer rubber, and a butyl acrylate-ethoxyethyl acrylate-vinylnorbornene-acrylonitrile copolymer rubber.

17. The composite according to claim 14, wherein the nitrile group-containing highly saturated copolymer rubber is an acrylonitrile-butadiene copolymer rubber containing 10 to 60% by weight, based on the weight of the copolymer rubber, of acrylonitrile units, and having an iodine value not larger than 120.

18. The composite according to claim 14, wherein said carboxyl group-containing highly saturated nitrile-conjugated diene copolymer rubber has an iodine value not larger than 120 and contains at least 0.02 equivalent weight, per 100 parts by weight of the copolymer rubber, of carboxyl group.

19. The composite according to claim 14, wherein said carboxyl group-containing highly saturated nitrile-conjugated diene copolymer rubber is a hydrogenated product of a carboxyl group-containing unsaturated nitrile-conjugated diene copolymer rubber comprising, based on the weight of the copolymer rubber, of 30 to 80% by weight of conjugated diene monomer units, 10 to 50% by weight of any unsaturated nitrile monomer units, 1 to 10% by weight of ethylenically unsaturated carboxylic acid monomer units, and 0 to 10% by weight of at least one copolymerizable ethylenically unsaturated monomer units.

20. A toothed belt having a toothed portion and a back portion, both of which have a rubber layer made of the composite as claimed in claim 14.

* * * * *